United States Patent [19]

Runyan

[11] Patent Number: 4,727,676

[45] Date of Patent: Mar. 1, 1988

[54] FISHING DEVICE

[75] Inventor: William S. Runyan, Ames, Iowa

[73] Assignee: Iowa State University Research Foundation Inc., Ames, Iowa

[21] Appl. No.: 431,336

[22] Filed: Sep. 30, 1982

[51] Int. Cl.$^4$ .................................... A01K 85/00
[52] U.S. Cl. ................................ 43/43.1; 43/43.12
[58] Field of Search ................ 43/43.1, 43.12, 43.14

[56] References Cited

U.S. PATENT DOCUMENTS

| | | |
|---|---|---|
| 725,428 | 4/1903 | Evans ........................ 43/43.1 |
| 1,804,084 | 5/1931 | Blake ........................ 43/43.1 |
| 2,792,663 | 5/1957 | Sinclair ..................... 43/43.1 |
| 2,907,133 | 10/1959 | Myers ........................ 43/43.1 |
| 2,961,793 | 11/1960 | Buchanan .................... 43/43.1 |
| 3,461,596 | 8/1969 | Green ........................ 43/43.1 |
| 3,468,053 | 9/1969 | Lux .......................... 43/43.1 |
| 3,500,576 | 3/1970 | Ostrom ...................... 43/43.12 |
| 3,832,795 | 9/1974 | Wolfe ........................ 43/43.1 |

Primary Examiner—Kurt Rowan
Attorney, Agent, or Firm—Zarley McKee, Thomte, Voorhees & Sease

[57] ABSTRACT

A fishing device adapted for fishing adjacent the bottom of a body of water is disclosed comprising an elongated resilient wire with a float on one end and a sinker on the other. The wire extends through an aperture in the sinker and is releasably held thereto by a bend in the wire which binds in the aperture. Means are connected to the float for securing a fish hook or lure thereon, and means are provided for securing a fishing line to the wire at its midpoint or adjacent the float.

One form of the invention uses a straight wire, and another form of the invention uses a wire that has a substantial angular bend near its midpoint.

2 Claims, 5 Drawing Figures

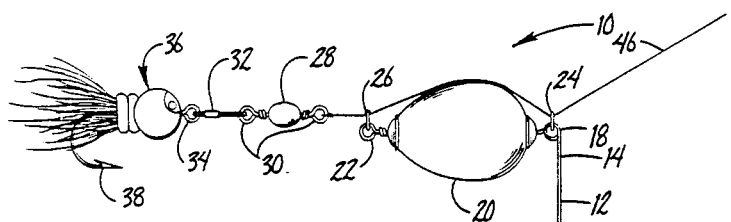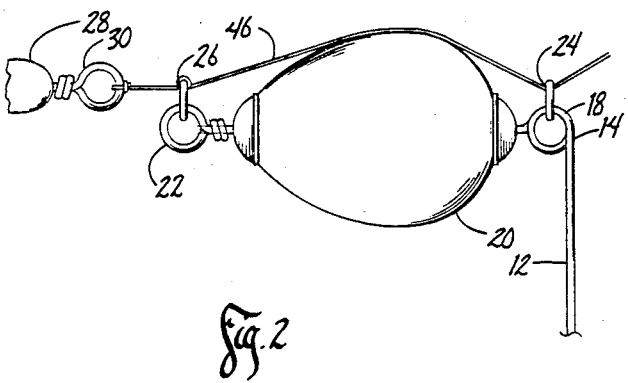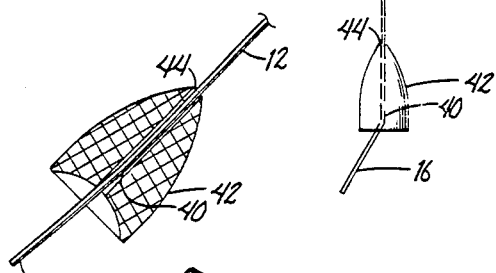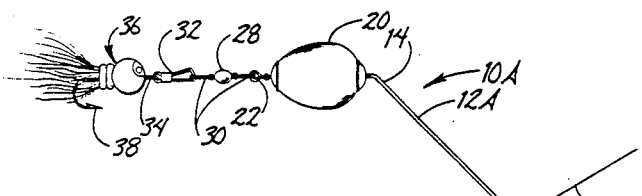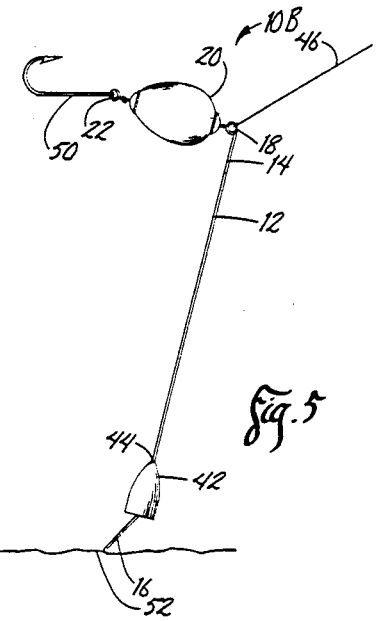

4,727,676

FISHING DEVICE

BACKGROUND OF THE INVENTION

In fishing for certain types of fish, it is desirable to use a sinker to cause the fish hook or lure to dwell near the bottom of the body of water where the fishing is taking place. The fishing apparatus is then drawn across the bottom of the body of water either by trolling or by casting and reeling the fish line in towards the rod to cause movement of the apparatus with respect to the bottom. While this method of fishing is useful in catching certain kinds of fish under certain fishing conditions, it invites the fishing apparatus to become snagged on debris and plant growth on the bottom of the body of water. When the snag is severe, the only recourse is to exert substantial tension on the fish line until it breaks whereupon the fishing apparatus, including a sometimes expensive fishing lure, is lost.

It is, therefore, a principal object of this invention to provide a fishing device adapted for fishing along the bottom of a body of water whereby the apparatus will be held adjacent the bottom, but the fish lure will be held slightly above the bottom to avoid entanglement with debris or plant growth.

A further object of this invention is to provide a fishing device which will be resistant to entanglement in vegetation and which is adapted to ride over obstructions such as rocks and logs.

A further object of this invention is to provide a fishing device which will have a sinker element which can be released from the fish lure if the sinker element becomes entangled, said release being effected by exerting tension on the fish line.

A still further object of this invention is to provide a fishing device which will result in the saving of valuable lures, hooks, and the like as well as float elements even though the sinker device used in connection therewith is hopelessly snagged.

A still further object of this invention is to provide a fishing device that can be reused many times even though the sinker element thereon may have become detached upon becoming snagged.

These and other objects will be apparent to those skilled in the art.

BRIEF SUMMARY OF THE INVENTION

The fishing device of this invention comprises an elongated resilient wire of stainless steel material. A float is secured to one end of the wire and a sinker element is detachably secured to the other end of the wire. A fish hook or lure is secured to the end of the wire adjacent the float element so that the float element will hold the fish hook or lure above the bottom of a body of water, while the sinker element will hold the other end of the wire adjacent the bottom of the body of water. The wire element is releasably secured to the sinker element so that if the sinker element becomes entangled in debris or vegetation on the bottom of the body of water, the wire can be forcibly released from the sinker by exerting tension on the fish line which is attached to the wire.

The sinker element is bullet shaped to provide a minimum of likelihood of entanglement with debris or vegetation. It is provided with an aperture through which the wire extends. An obtuse angle is imposed in the wire to permit it to yieldably resist removable of the sinker element therefrom. One form of the invention involves a straight wire with the lure, hook and fishing line secured to one end thereof. Another form of the invention provides for a bend substantially at the midpoint of the wire with the fish line being secured to the midpoint of the wire.

BRIEF DESCRIPTION OF THE DRAWINGS

FIG. 1 is a side elevational view of the device of this invention;

FIG. 2 is a partial elevational view at an enlarged scale of the float and related elements of FIG. 1;

FIG. 3 is an enlarged scale sectional view through the sinker element of the device of FIG. 1 showing the sinker element in the process of being released from the wire element;

FIG. 4 is a side elevational view of a modified form of the invention; and

FIG. 5 is a reduced scale elevational drawing of a modified form of the invention similar to that of FIG. 1.

DESCRIPTION OF THE PREFERRED EMBODIMENT

The numeral 10 designates the fishing device of this invention which is comprised of an elongated stainless steel wire 12 having an upper end 14 and a lower end 16. An eyelet 18 is formed in the upper end of the wire, and eyelet 18 terminates on the longitudinal axis of float 20. An eyelet 22 extends from the opposite end of float 20 as best shown in FIG. 2, and eyelet 22 is also preferably located on the longitudinal axis of the float. A conventional ring 24 is inserted into eyelet 18 and a ring 26 is inserted into the eyelet 22.

The numeral 28 designates a conventional swivel having eyelets 30 located in the opposite ends thereof. A conventional snap mechanism 22 connects one of the eyelets 30 with the eyelet 34 on lure 36. Lure 36 includes a conventional hook element 38.

An obtuse angle bend is imposed in wire 12 adjacent its lower end 16 as best shown in FIGS. 1 and 3. A sinker element of lead or the like is shaped like a bullet and has a longitudinal aperture 44 extending along its longitudinal axis.

A conventional fish line 46 has one end secured to a rod and reel (not shown). The fish line 46 then extends through ring 24, thence longitudinally across the top of float 20 and through ring 26 where it is secured to the forwardmost eyelet 30 of swivel 28.

FIG. 5 shows the fishing device 10 in use but with a conventional fish hook 50 directly connected to the swivel 22 of float 20.

The fishing device 12A shown in FIG. 4 is a modified form of the fishing device 10 shown in FIGS. 1 and 5. The fishing device 10A is substantially identical to the fishing device 10 except that the elongated wire 12A has an eyelet 48 formed at the substantial midpoint thereof with the wire 12A being bent at an approximately 90° angle. The fish line 46 is then conventionally connected to the eyelet 48.

Fishing device 10 can be assembled either as shown in FIG. 1 or 5. When the assembly shown in FIG. 5 is utilized, the fish line 46 is connected directly to eyelet 18. When fishing device 10A of FIG. 4 is utilized, the fish line 46 is connected to eyelet 48 as previously described. It should be noted that the eyelet 18 in fishing device 10 can be eliminated in the fishing device 12A as shown in FIG. 4.

The float 20 maintains the upper ends of the fishing devices 10 and 10A at an elevated position above the bottom 52 of the body of water which serves to maintain the lure 36 or the hook 50 in an elevated position with respect to the bottom 52. This minimizes the possibility that the hook 38 or the hook 50 will become entangled in any debris or vegetation present, near or on the bottom 52.

At the same time, the sinker element 42 maintains the lower end of the fishing devices adjacent the bottom 52 so that the entire apparatus will be maintained at the desired fishing level. The bullet shaped sinker element 42 will not easily catch on debris or vegetation because of its shape. In the event that it does become entangled in vegetation or debris, tension created by the fisherman on line 46 will cause the sinker element to slide over the obtuse angle bend 40 as shown in FIG. 3 of the drawing which will release the sinker element from the lower end of the wire 12 or 12A.

When the fishing devices 10 and 10A are released from the entangled sinker element 42, the devices can be retrieved by the fisherman, and a new sinker element can be imposed on the lower end of the wires 12 or 12A. The "memory" of the wires will cause the bend 40 to always retain its original position even though the angle is resiliently changed as the sinker element is pulled from the lower end of the wire.

It is seen from the foregoing that the device of this invention is resistant to entanglement and will keep the bait or lure attached to the device suspended above the bottom. Sinkers of varying density can be interchanged on the devices to correspond to different types of lures and to accommodate variations in water conditions and depth. If a sinker element is pulled free fom the device, it can be readily replaced without losing the lure or he float.

Thus, from the foregoing, it is seen that the devices of this invention will achieve at least their stated objectives.

I claim:

1. A fishing device adapted for fishing near the bottom of a body of water, comprising, an elongated resilient wire means including a straight wire element having upper and lower ends, connecting means on said upper end for securing said wire element to the line of a fishing rod for pulling said fishing device in a forward direction through a body of water, a float means secured to said upper end of said wire element, and a hook means movably connected to said float means so that said float means will buoyantly hold said hook means and upper end of said wire element at an elevated position in a body of water with respect to the lower end of said wire element, a sharp obtuse angle bend means in said wire element adjacent said lower end, defining a straight lower end portion below said bend means, a sinker element having an elongated aperture therethrough, said wire element slidably extending through said elongated aperture, said sinker element being positioned adjacent and above said obtuse angle bend means whereby said obtuse angle bend means releasably prevents said sinker element from sliding off of the lower end of said wire element, the resiliency of said wire element, and the size of said aperture and said obtuse angle being such that pulling tension in a forward direction on the upper end of said wire element by a line attached thereto will cause said wire element at said obtuse angle bend means to straighten sufficiently when said sinker element is held against forward movement that said wire element will slidably and forwardly move through said aperture and said sinker element will slide from the lower end of said wire element.

2. The device of claim 1 wherein said wire means further includes a wire portion integrally connected to said wire element at said connection means and extends rearwardly therefrom at a substantial right angle to said wire element, with said float means and said hook means being connected to said wire portion.

* * * * *